W. R. GOLDEN.
METALLIC SKELETON SPACE BLOCK FOR GIN SAWS.
APPLICATION FILED SEPT. 27, 1910.
1,016,742.
Patented Feb. 6, 1912.
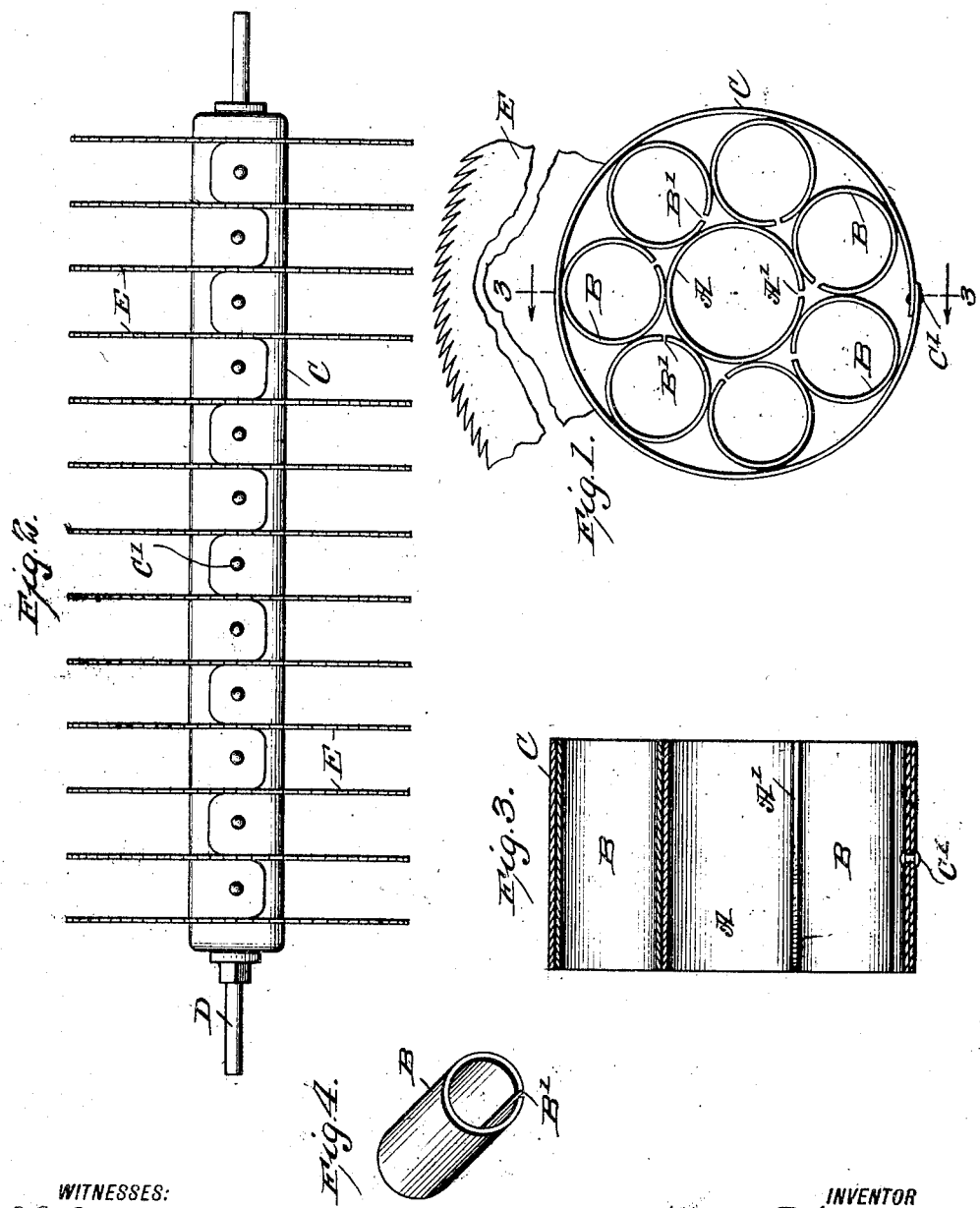
WITNESSES:
INVENTOR
WILLIS R. GOLDEN
BY
ATTORNEYS

UNITED STATES PATENT OFFICE.

WILLIS R. GOLDEN, OF ATLANTA, GEORGIA.

METALLIC SKELETON SPACE-BLOCK FOR GIN-SAWS.

1,016,742.  Specification of Letters Patent.  Patented Feb. 6, 1912.

Application filed September 27, 1910. Serial No. 584,080.

*To all whom it may concern:*

Be it known that I, WILLIS R. GOLDEN, a citizen of the United States, and a resident of Atlanta, in the county of Fulton and State of Georgia, have invented certain new and useful Improvements in Metallic Skeleton Space-Blocks for Gin-Saws, of which the following is a specification.

This invention is an improvement in space blocks for use in spacing apart the saws of a gang and is especially designed for use in spacing apart gin saws, and the invention has for an object to provide a novel form of block in which the members thereof are yieldable laterally independently of each other, also wherein is provided a circular series of spacing members which surround the axis of the block and are loosely confined, the axes of the several rings of the series being approximately parallel with the axis of the block.

The invention consists in certain novel constructions and combinations of parts as will be hereinafter described and claimed.

In the drawing Figure 1 is a side view of one of the spacing blocks, a portion of one of the saws being shown. Fig. 2 is an edge view showing a series of saws with a number of the spacing blocks between the same, together with the shaft. Fig. 3 is a section of the spacing block on about line 3—3 of Fig. 1. Fig. 4 is a detail perspective view of one of the rings of the circular series.

As shown, the block comprises a central ring A, which is an open ring, being split or separated at A'. Around this ring is loosely fitted a circular series of ring like members B which are open rings, being split at B' and around the circular series of rings B is fitted an inclosing band C, which is a closed ring, being as shown, formed of a strip of metal fastened together at its ends at C'.

The rings B are loosely confined between the central ring A and the inclosing band C. In practice the rings A and B are placed within the band C by hand and then placed on the shaft by fitting the ring A over the shaft D. A saw E may then be placed against the spacing block and another spacing block applied against the opposite side of the saw. When the entire shaft is filled the collar and nut are placed on the open end of the shaft and screwed up in position. Then the saws are trained. This makes a standard interchangeable saw shaft. In explaining this, it will be understood that gins are made of different standards, for instance, there is a 35 saw gin, a 60 saw gin, a 70 saw gin and other numbers of saws. The manufacturer can, by using the construction herein described, make up his 70 saw shafts and after training them, they can be interchanged with any other standard 70 saw gin of his class; likewise he can make up a 35 saw shaft and after training, it will be interchangeable with any other 35 saw gin of his class, whereas under the present method this could not be done inasmuch as the warping of wooden blocks and the "saucer" allowed in the saws, by other metal blocks would necessitate the saws being retrained on the shaft at their destination.

It will be noticed that my invention will avoid the difficulties resulting from the warping of wooden blocks and that the series of loosely confined spacing members B which surround the axis of the block, furnish pressure against the saws from the shaft nearly to the teeth of the saws, thus preventing the saws from "saucering" in the use of the invention.

It will be noticed also that the blocks have members which are yieldable independently of each other.

The object of splitting the ring A is to insure that it will fit on any reasonably sized shaft, and the object of splitting the rings B is to insure their being held within the circle and at the same time force equal pressure on all sides of the circle, and therefore keep the ring C perfectly round and keep the same amount of space at all times against each saw.

Manifestly the different rings and the inclosing band may be made of any suitable size, material or thickness of metal to adapt them for the special use to which they are to be applied.

The construction is simple, can be used either on a plain gin, a huller gin or a linter, can be economically produced, will be found durable in practice and efficiently serves the purpose for which it is designed.

I claim:

1. A spacing block for saws comprising a central split ring, a circular series of split rings surrounding the central ring with the adjacent rings in contact with each other and an inclosing band around the said circle of rings, substantially as set forth.

2. The combination of a shaft, saws thereon, and a spacing block comprising a central ring to encircle a shaft, a series of ring like members encircling the central ring and an inclosing band.

3. A spacing block comprising a central ring to encircle a shaft and a circular series of split rings encircling the central ring together with means for retaining the circular series of rings.

4. A spacing block comprising a central ring to encircle a shaft, a circular series of split rings encircling the central ring and an inclosing band encircling the series of split rings.

5. A spacing block comprising a central ring to encircle the shaft and split or opened, a circular series of split rings encircling the central ring and an inclosing band, the circular series of split rings being loosely confined between the central ring and the inclosing band.

6. A spacing block for gin saws comprising a central ring, a circular series of rings surrounding the central ring and an inclosing band around the said circle of rings, the inclosing band and the rings being of the same length in an axial direction whereby saws spaced apart by said block will be pressed against by the ends of the inclosing band and of the rings of the series.

7. The combination of a shaft, saws thereon and a block between the saws and comprising a ring encircling the shaft, a circular series of ring like members encircling said first ring and of a length equal to the extreme axial length of the block and an inclosing band around the circular series of ring like members, substantially as set forth.

WILLIS R. GOLDEN.

Witnesses:
FRED R. MILLER,
WALTER C. HENDRIX.